(12) United States Patent
Norman et al.

(10) Patent No.: US 10,893,776 B1
(45) Date of Patent: Jan. 19, 2021

(54) COOKING PLATE WITH TEMPERATURE SENSING ELEMENT

(71) Applicant: Palate Home Inc., Walnut, CA (US)

(72) Inventors: Eric Norman, Walnut, CA (US); Paolo Baruzzi, Fremont, CA (US); John Hsudan Yu, Fremont, CA (US)

(73) Assignee: Desora Inc., Cambridge, MA (US)

( * ) Notice: Subject to any disclaimer, the term of this patent is extended or adjusted under 35 U.S.C. 154(b) by 514 days.

(21) Appl. No.: 15/693,382

(22) Filed: Aug. 31, 2017

Related U.S. Application Data

(60) Provisional application No. 62/383,559, filed on Sep. 5, 2016.

(51) Int. Cl.
*A47J 37/06* (2006.01)

(52) U.S. Cl.
CPC .................................. *A47J 37/0611* (2013.01)

(58) Field of Classification Search
CPC .............. A47J 37/0629; A47J 27/21158; A47J 37/0611; A47J 27/58; A47J 27/02; A47J 31/10; A47J 31/06; A47J 31/4439; A47J 36/2466
USPC ................. 99/331–333, 342–344, 339, 340, 99/349–351, 352–355, 372–382, 400, 99/401, 444–450, 422–425; 126/20, 369, 126/41 R; 219/521, 524, 538, 401, 586, 219/446.1, 448.11, 450.1, 451.1, 447.1; 426/523
See application file for complete search history.

(56) References Cited

U.S. PATENT DOCUMENTS

| | | | |
|---|---|---|---|
| 3,511,971 A * | 5/1970 | Keating | G05D 23/24 219/448.11 |
| 5,441,344 A | 8/1995 | Cook, III | |
| 5,546,851 A * | 8/1996 | Goto | A47J 37/0676 99/446 |
| 5,716,657 A * | 2/1998 | Liebermann | A23L 3/10 426/232 |
| 6,262,399 B1 * | 7/2001 | Lau | A47J 37/0676 219/450.1 |
| 6,595,115 B1 | 7/2003 | Lin | |
| 9,237,826 B2 | 1/2016 | Robinson et al. | |
| 2013/0051831 A1 * | 2/2013 | Shinagawa | G03G 15/2032 399/69 |
| 2015/0064316 A1 | 3/2015 | Volatier et al. | |

* cited by examiner

*Primary Examiner* — Dana Ross
*Assistant Examiner* — Ket D Dang
(74) *Attorney, Agent, or Firm* — Aka Chan LLP

(57) ABSTRACT

A cooking plate includes a metal plate for cooking; a heating element, which is in contact with the metal plate and is configured to heat the metal plate; and a temperature sensing element which is integrated with the metal plate and which is configured to sense a temperature of the metal plate and outputs a sensing signal for control heating of the heating element.

15 Claims, 12 Drawing Sheets

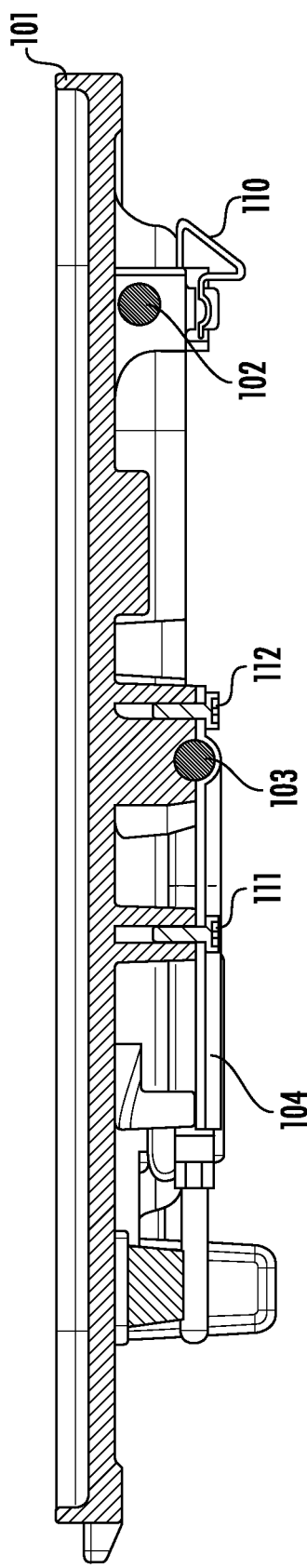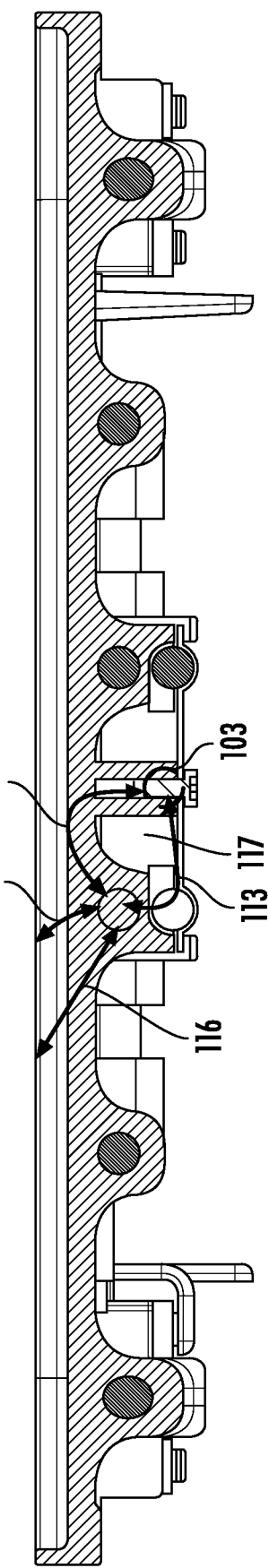
FIG. 2
FIG. 3

COOKING PLATE WITH TEMPERATURE SENSING ELEMENT

CROSS-REFERENCE TO RELATED APPLICATIONS

This patent application claims the benefit of U.S. patent application 62/383,559, filed Sep. 5, 2016, which is incorporated by reference along with all other references cited in this application.

BACKGROUND OF THE INVENTION

This invention relates to the field of cooking appliance, and in particular, to a cooking plate, a temperature sensing element for a cooking plate, a manufacturing method of a temperature sensing element for a cooking plate, a cooking appliance and a manufacturing method of a cooking plate.

Generally, cooking appliances are used to cook food. There are many kinds of such cooking appliances. According to different cooking requirements and different foods, different cooking appliances are designed and manufactured.

Cooking food such as steak, bacon, egg, and others on a hot plate will produce a special flavor. A lot of people like such a taste. However, it is not an easy cooking method. In most situations, a normal person cannot cook a food like that cooked by a chef in a restaurant. One reason is the skills and experiences of the chef. The chef can determine the status or temperature of the food based on the appearance and knows how to control the heating. A normal person lacks such skills and experiences to precisely control the cooking temperature.

A heating device such as an oven and an induction cooker does not contact food directly. So, it is not necessary for such device to obtain a precise value of temperature. For example, an oven generally just detects the air temperature inside it, and an induction cooker detects the temperature of the bottom of a food container.

In most cases, a household cooking appliance uses a temperature sensor to roughly detect the temperature. This may be sufficient for cooking sandwich. But, it may not be enough for cooking other food such as steak, bacon, egg, mince ball, and others and may be the reason that a person cannot cook food as that in restaurant because of an inaccurate control of temperature.

On the other hand, a person may use a probe of temperature sensor and penetrate the food with it to detect the temperature. This is not convenient and is not intelligent.

U.S. Pat. No. 9,237,826 (U.S. patent application Ser. No. 13/393,831) describes a sandwich press and grill apparatus, which is incorporated by reference. U.S. Pat. No. 5,441,344 describes a temperature measurement and display of a cooking surface, which is incorporated by reference. U.S. Pat. No. 6,595,115 discloses a temperature sensor for a cooking device, which is incorporated by reference. A reference to a patent document or other matter in this application which is given as prior art is not to be taken as an admission or a suggestion that the information it contains was relevant to the subject matters of the claims or was part of the common general knowledge as at the priority date of any of the claims.

Most professional cooking appliances such as those used in a restaurant are of big volume and are not suitable for house use. Therefore, people have to compromise on the food and the installation of such appliances by buying food from restaurants. On one hand, this may be expensive. On the other hand, people will lose the pleasure of cooking food with family at home.

Therefore, an improved cooking plate is needed, especially a cooking plate that can provide an accurate temperature sensing of the food being cooked using the plate.

BRIEF SUMMARY OF THE INVENTION

A cooking plate includes a metal plate for cooking; a heating element, which is in contact with the metal plate and is configured to heat the metal plate; and a temperature sensing element which is integrated with the metal plate and which is configured to sense a temperature of the metal plate and outputs a sensing signal for control heating of the heating element.

According to a first aspect of this invention, there is provided a cooking plate, including: a metal plate for cooking; a heating element, which is in contact with the metal plate and is configured to heat the metal plate; and a temperature sensing element which is integrated with the metal plate and which is configured to sense a temperature of the metal plate and outputs a sensing signal for control heating of the heating element.

In an embodiment, the heating element includes a resistive wire. In an embodiment, the resistive wire is encapsulated in a first tube, and a first filler material which is thermally conductive and electrically insulating is filled between the resistive wire and the sheath of the first tube. In an embodiment, the first filler material is magnesium oxide (MgO) or magnesia. In an embodiment, the resistive wire is connected with a rod at each of its ends and the rods reach out of the first tube for power coupling.

In an embodiment, the heating element is bent into at least five U-shape bends. In an embodiment, the heating element is integrated with the metal plate. In an embodiment, the heating element is embedded in the metal plate by mold casting. In an embodiment, a spacing material which has a less thermal conductivity than that of the metal plate is inserted between the temperature sensing element and the heating element. In an embodiment, the spacing material is air.

In an embodiment, the temperature sensing element includes a temperature sensor, and the effective distance between the cooking surface of the metal plate and the heating element is equal to that between the temperature sensor and the heating element. In an embodiment, the temperature sensing element is integrated in a cavity at a back side of the metal plate and is affixed on the metal plate by a pressure plate.

In an embodiment, the temperature sensing element includes a temperature sensor and a sheath, the temperature sensor is encapsulated in the sheath to form a second tube, and a second filler material which is thermally conductive and electrically insulating is filled between the temperature sensor and the sheath of the second tube. In an embodiment, the temperature sensor is connected with a rod at each of its ends via a wire and the rods reach out of the second tube for power coupling.

In an embodiment, the temperature sensing element includes a resistance temperature detector (RTD) temperature sensor. In an embodiment, a front surface of the metal plate is used to be in direct contact with food. In an embodiment, a front surface of the metal plate is applied with nonstick coating. In an embodiment, the cooking plate is to be used in a portable cooking appliance.

According to a second aspect of this invention, there is provided a temperature sensing element for a cooking plate, including: a temperature sensor; a sheath; and filler material which is thermally conductive and electrically insulating, where the temperature sensor is connected with a rod at each of its ends via a wire, the sheath encapsulates the temperature sensor, the wires and parts of the rods with the filler material therebetween to from a tube, the rods reach out of the tube for power coupling.

In an embodiment, the temperature sensing element is configured to sense a temperature of the metal plate and outputs a sensing signal for control the heating of the heating element. In an embodiment, the temperature sensing element has a shape consistent with a cavity in the cooking plate. In an embodiment, the temperature sensor is an RTD temperature sensor.

According to a third aspect of this invention, there is provided a manufacturing method of a temperature sensing element for a cooking plate, including: connecting one terminal of a temperature sensor to one end of a first wire; connecting the other terminal of the temperature sensor to one end of a second wire; connecting the other end of the first wire to a first rod; connecting the other end of the second wire to a second rod; placing the connected sensor, wires and rods inside a tube; filling a filler material which is thermally conductive and electrically insulating into the tube; and sealing the tube.

In an embodiment, the first and second rods are threaded rods, and the manufacturing method further includes: screwing caps on the first and second rods. In an embodiment, the temperature sensor is an RTD-type sensor. In an embodiment, sealing the tube including: adding plugs at the ends of the tube. In an embodiment, one and the other terminals of the temperature sensor are connected to one end of the first wire and one end of the second wire, respectively, by welding.

In an embodiment, the other end of the first wire is connected to the first rod by welding, and the other end of the second wire is connected to the second rod by welding. In an embodiment, filling a filler material including: using vibration to compact the filler material. In an embodiment, the filler material includes magnesium oxide.

According to a fourth aspect of this invention, there is provided cooking appliance, including the cooking plate according to the present invention. In an embodiment, the cooking appliance is a portable appliance.

According to a fifth aspect of this invention, there is provided manufacturing method of a cooking plate, including: making a heating element; making a temperature sensing element; making a metal plate for cooking, where the heating element is integrated with the metal plate by casting; and assembling the metal plate and the temperature sensing element, where the temperature sensing element is integrated with the metal plate.

In an embodiment, making a heating element includes: connecting one end of a resistive wire to a first rod; connecting the other end of the resistive wire to a second rod; preparing a heating tube, in which a first filler material which is thermally conductive and electrically insulating is filled and which has a hollow cavity; threading the resistive wire through the hollow cavity; rolling the heating tube through a roller to shrink the diameter of the heating tube; and bending the heating tube, where the first and second rods reach out of the heating tube. In an embodiment, the heating tube is bent into at least five U-shape bends.

In an embodiment, making a temperature sensing element including: connecting one terminal of a temperature sensor to one end of a first wire; connecting the other terminal of a temperature sensor to one end of a second wire; connecting the other end of the first wire to a first sensing rod; connecting the other end of the second wire to a second sensing rod; placing the connected sensor, wires and sensing rods inside a sensing tube; filling a filler material which is thermally conductive and electrically insulating into the sensing tube; and sealing the sensing tube.

In an embodiment, making a metal plate for cooking including: placing the heating element in a cooking plate die casting mold at a designed position; performing a die casting process with the cooking plate die casting mold to form a metal plate with the integrated heating element.

In an embodiment, assembling the metal plate and the temperature sensing element includes: placing the temperature sensing element in a cavity at a back side of the metal plate; and affixing the temperature sensing element on the metal plate by a pressure plate.

According to an embodiment of this invention, the cooking plate can provide an accurate temperature sensing.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 2 shows a schematic cross-section view taken from the dash line A-A' of FIG. 1.

FIG. 3 shows a schematic cross-section view taken from the dash line B-B' of FIG. 1.

DETAILED DESCRIPTION OF THE INVENTION

Figure 1:
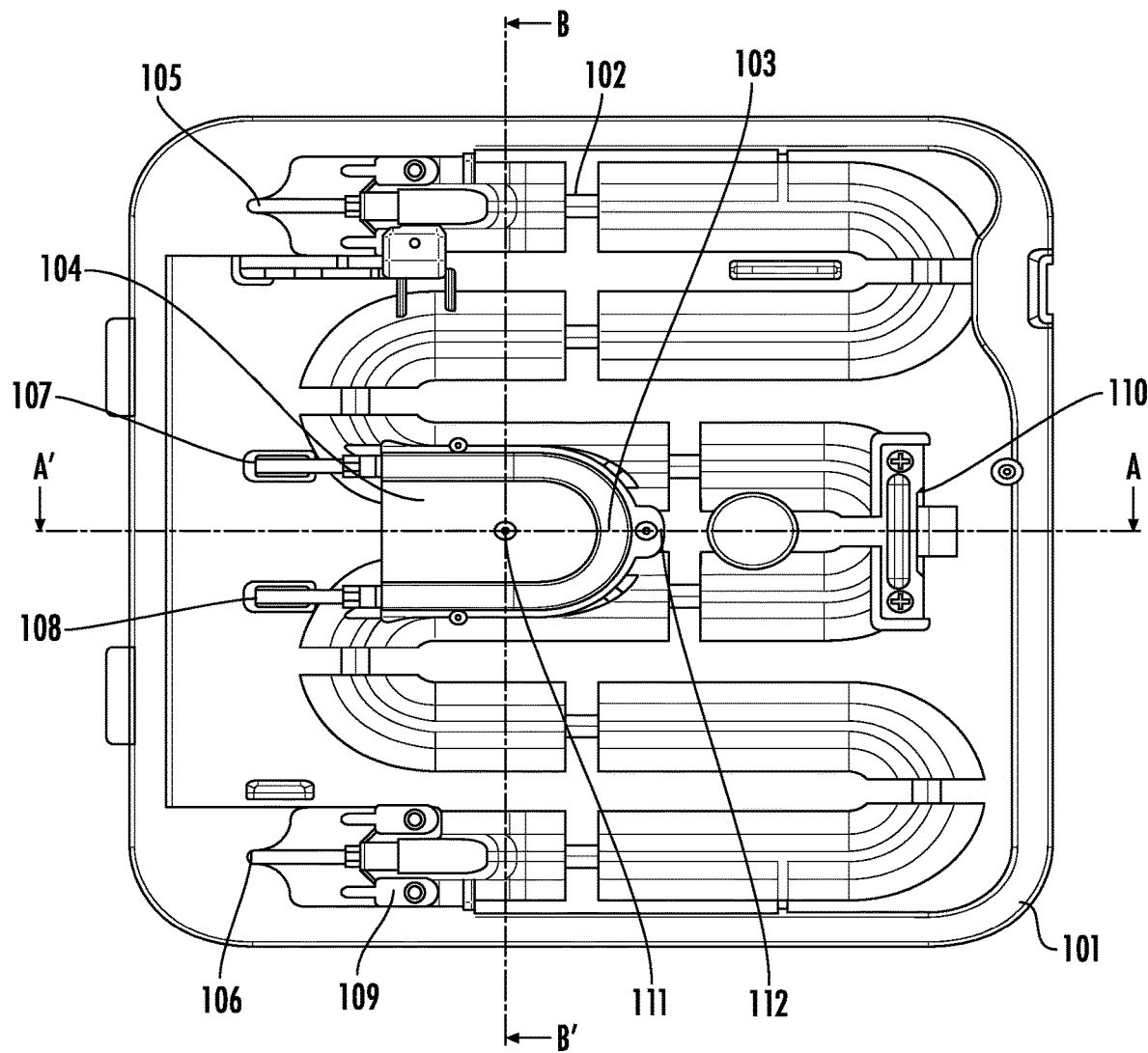
FIG. 1 shows a schematic diagram of a back side of a cooking plate according to an embodiment of the present invention.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses. Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and nonlimiting. Thus, other examples of the exemplary embodiments could have different values.

Notice that similar reference numerals and letters refer to similar items in the following figures, and thus once an item is defined in one figure, it is possible that it need not be further discussed for following figures.

FIG. 1 shows a schematic diagram of a back side of a cooking plate according to an embodiment of the present invention. FIG. 2 shows a schematic cross-section view taken from the dash line A-A' of FIG. 1. FIG. 3 shows a schematic cross-section view taken from the dash line B-B' of FIG. 1.

As shown in FIG. 1, the cooking plate includes a metal plate 101, a heating element 102 and a temperature sensing element 103.

Here, the metal plate 101 is used for cooking. For example, the front surface of the metal plate is used to be in direct contact with food. After the cooking plate is assembled into a cooking appliance, food such as steak, bacon, egg, and others can be put on the front surface of the metal plate for cooking. In an example, the front surface of the metal plate is applied with nonstick coating so that it is easy to wash.

In FIG. 1, the heating element 102 is in contact with the metal plate and is configured to heat the metal plate. It can be understood by a person in the art that the heating element can be any mechanism which can heat the metal plate 101 or make the metal plate to produce heat for cooking food.

The temperature sensing element 103 is integrated with the metal plate. For example, the temperature sensing element 103 include an RTD-type sensor, such as a PT1000 RTD-type sensor. It will be understood by a person skilled in the art, other temperature sensor is also possible, such as a thermocouple, infrared (IR) temperature sensor, and others.

In this embodiment, the temperature sensing element 103 is built in or integrated with the metal plate 101. A person skilled in the art can conceive of a lot of approaches to integrate the sensing element. For example, in FIG. 1, the temperature sensing element 103 is integrated in a cavity at the back side of the metal plate 101 and is affixed on the metal plate by a pressure plate 104. Alternatively or in addition, the temperature sensing element 103 can be embedded in the metal plate 101 by die casting.

The temperature sensing element 103 senses a temperature of the metal plate 101 and outputs a sensing signal for control heating of the heating element 102.

In this embodiment, since the temperature sensing element 103 is integrated with the metal plate 101, the contact between these two element is sufficient. For example, compared with the solution in which the temperature sensing element and the cooking plate are separate components, less gaps will be formed between them. This will make temperature sensing element 103 produce a more precise temperature sensing signal.

Furthermore, the relative position of the temperature sensing element 103 and the metal plate 101 is fixed in this embodiment. The sensing result will be relatively stable, compared with a solution of separate components. So, a control system will be simplified to some degree to obtain an accurate temperature control. By this approach, it is easier to determine the temperature on the cooking surface (i.e. the front surface of the metal plate).

For example, the heating element 102 is also integrated with the metal plate. As an example, the heating element 102 can be embedded in the metal plate 101 by mold casting as shown in FIG. 1 or can be affixed on the metal plate 101 by a pressure plate. In this configuration, the thermal conduction pathways among the metal plate 101, the heating element 102 and the temperature sensing element 103 are constant. So, the sensing result of the temperature sensing element 103 will be accurate, and the cooking temperature control will be precise.

In FIG. 1, the heating element 102 includes plugs 105, 106 for power coupling. The plugs can be supported on insulating standoffs 109 to enhance the stability of the connection pieces and to secure the isolation of the electricity and the metal plate.

The plugs 107 and 108 of the temperature sensing element are used to transmit sensing signals to a control system. The latching mechanism 110 can latch the cooking plate on a cooking appliance.

In FIG. 2, the temperature sensing element 103 is affixed on the metal plate 101 by the pressure plate 104. The pressure plate 104 is affixed on the metal plate 101 by screws 111 and 112.

As shown in FIG. 3, a spacing material is inserted between the temperature sensing element 103 and the heating element 102. The spacing material has a less thermal conductivity than that of the metal plate. For example, the spacing material can be air gap (the air gap 117 shown in FIG. 3) or other material. A person skilled in the art shall understand that the temperature sensing element 103 and the heating element 102 can connect in other parts, and the spacing material is placed in therebetween. By the spacing material, the thermal conduction pathway between the heating element 102 and the temperature sensing element 103 can be adjusted.

The temperature sensing element 103 includes a temperature sensor. Also as shown in FIG. 3, there are multiple thermal conductive pathways 113, 114, 115, and 116 between the cooking surface of the metal plate 101 and the heating element 102 and between the temperature sensor and the heating element 101, respectively. The effective distances between the cooking surface of the metal plate 101 and the heating element 102 is equal to the effective distances between the temperature sensor and the heating element 101. It shall be understood by a person skilled in the art how to determine the effective distance. For example, the effective distance can be determined by measuring the thermal conductivities. More specifically, with respect to the heating element 101, the position in the metal plate which has a thermal conductivity similar to the cooking surface can be deemed to have an effective distance similar to the cooking surface. An average position of multiple measurements for multiple points on the cooking surface can be used to determine the position of the temperature sensor.

In this embodiment, the cooking plate is suitable for household use, especially for using in a portable cooking appliance. Because of the structure and/or components of the cooking plate, it allows for accurate temperature sensing. A normal user can cook in modern methods such as precision cooking, sous vide style cooking, target temperature cooking and so on at home. Every user can make high quality food. A cooking appliance incorporating such a cooking plate can be used to do a high temperature electric grill, a precise lower temperature sous vide and even a well controlled saute pan like a skilled chef.

Because of the relatively stable temperature sensing, the control systems (electronics and software) of a cooking appliance with the cooking plate of this embodiment will be less sophisticated than that of the prior art.

Figure 4:
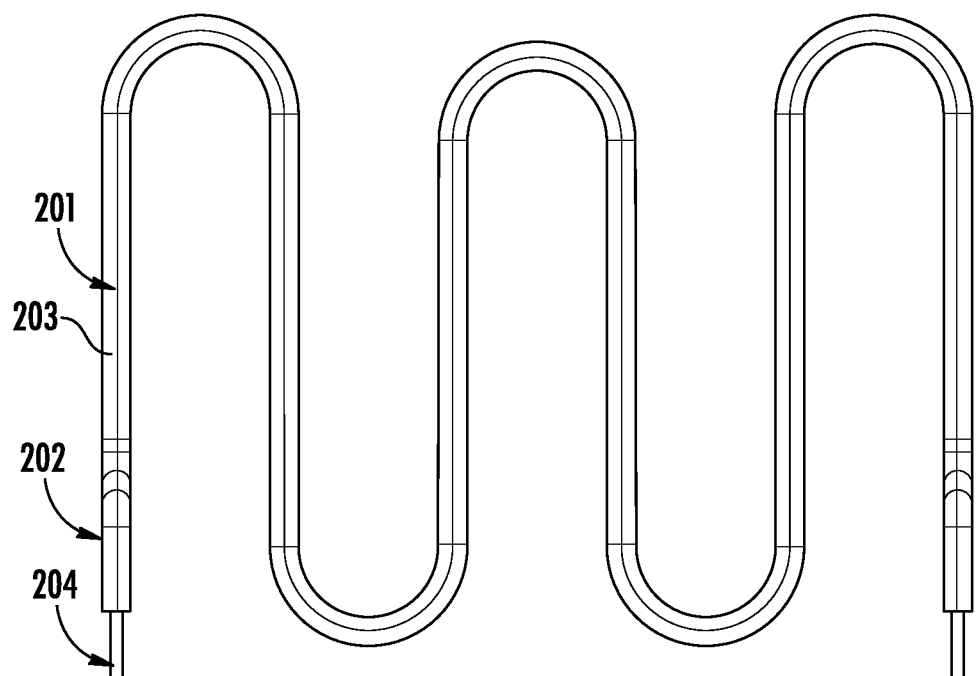
FIG. 4 shows a schematic diagram of a heating element according to an embodiment of the present invention.
Figure 5:
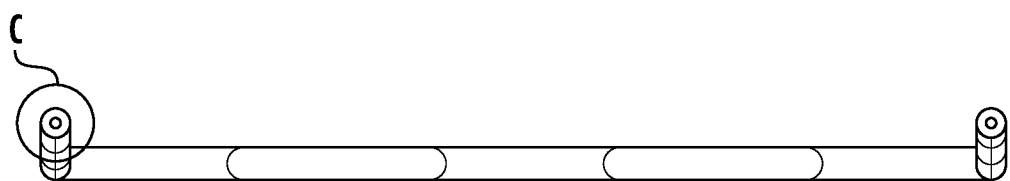
FIG. 5 shows a bottom view of the heating element shown in FIG. 4.
Figure 6:
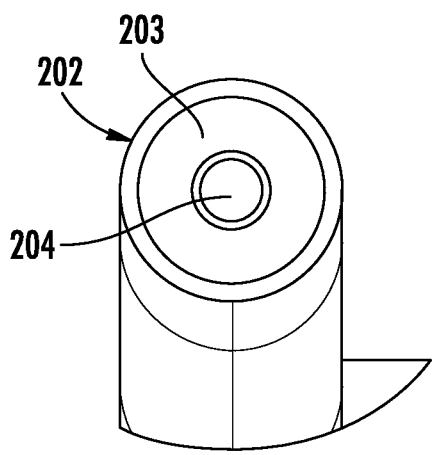
FIG. 6 is an enlarged view of the cross section indicated by circle C in FIG. 5

FIG. 4 shows a schematic diagram of a heating element according to an embodiment of the present invention. FIG. 5 shows a bottom view of the heating element shown in FIG. 4. FIG. 6 is an enlarged view of the cross section indicated by circle C in FIG. 5.

In FIGS. 4-6, the heating element is assembled into a tube and includes a resistive wire 201, a sheath 202, a filler material 203, and rods 204.

The resistive wire 201 is encapsulated in the tube. The filler material 203 is thermally conductive and electrically insulating and is filled between the resistive wire 201 and the sheath 202 of the first tube. For example, the first material is magnesium oxide.

The resistive wire 201 is connected with a rod 204 at each of its ends. The rods 204 reach out of the tube for power coupling. They can be used as the plugs 105 and 106 as shown in FIG. 1.

It can be seen in FIGS. 1 and 4, the heating element 102 is bent into at least five U-shape bends. By this arrangement, the heating element 102 will produce a relatively even heating at the cooking surface of the metal plate.

Figure 7:
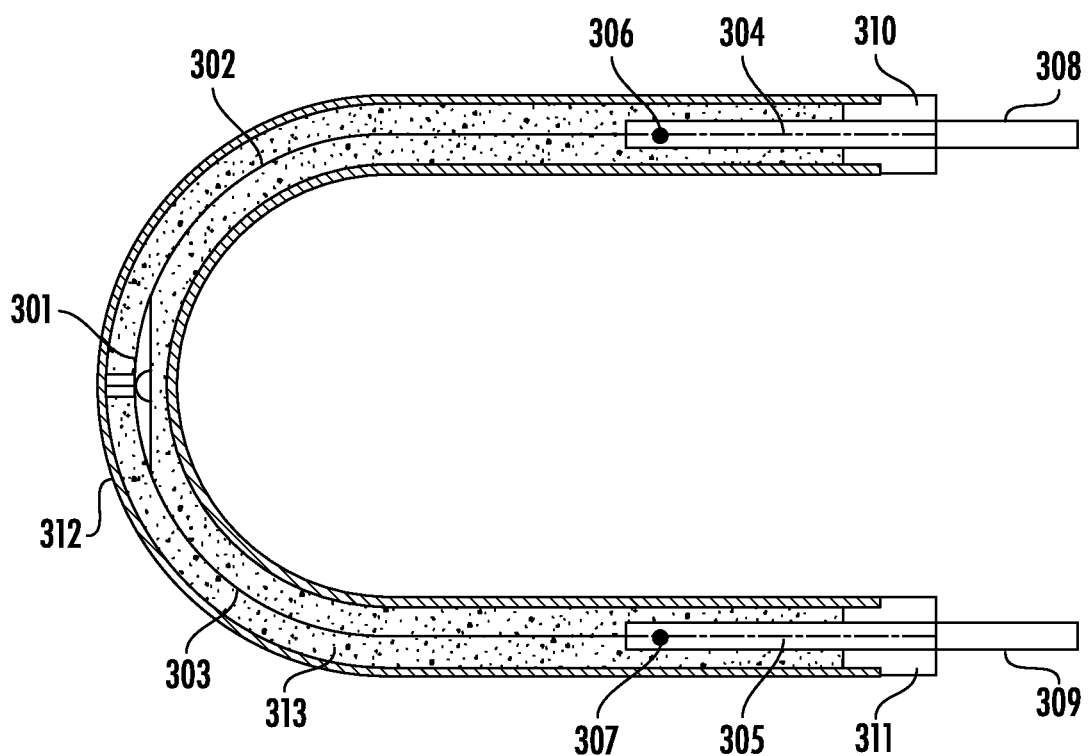
FIG. 7 shows a schematic diagram of a temperature sensing element according to an embodiment of the present invention.

FIG. 7 shows a schematic diagram of a temperature sensing element according to an embodiment of the present invention.

The temperature sensing element is used for a cooking plate. It has a temperature sensor 301, a sheath 312, and filler material 313. In this embodiment, the temperature sensing element is assembled into a tube.

As shown in FIG. 7, the temperature sensor 301 is connected with a rod 304 and 305 at each of its ends via a wire 302 and 303. The sheath 312 encapsulates the temperature sensor 301, the wires 302 and 303 and parts of the rods 304 and 305 with the filler material 313 therebetween to from a tube. The rods 304 and 305 reach out of the tube for power coupling.

The wires 302 and 303 can be welded to the rods 304 and 305 at the points 306 and 307, respectively. The rods 304 and 305 can threaded rods. Caps 308 and 309 can be screwed on the ends of the rods 304 and 305 out of the tube. Sealing material or plugs 310 and 311 can be applied at the ends of the tube to seal the filler material 313 and fix the components in the tube.

For example, the temperature sensor is an RTD temperature sensor, for example, a PT1000 RTD-type sensor by Thermometrics Corporation.

The temperature sensing element shown in FIG. 7 is suitable for use in a cooking appliance. It can sense the temperature of a metal plate of such an appliance and outputs a sensing signal for control the heating of a heating element. The temperature sensing element can have a shape consistent with a cavity in a cooking plate, so that it can be integrated in it.

Figure 8:
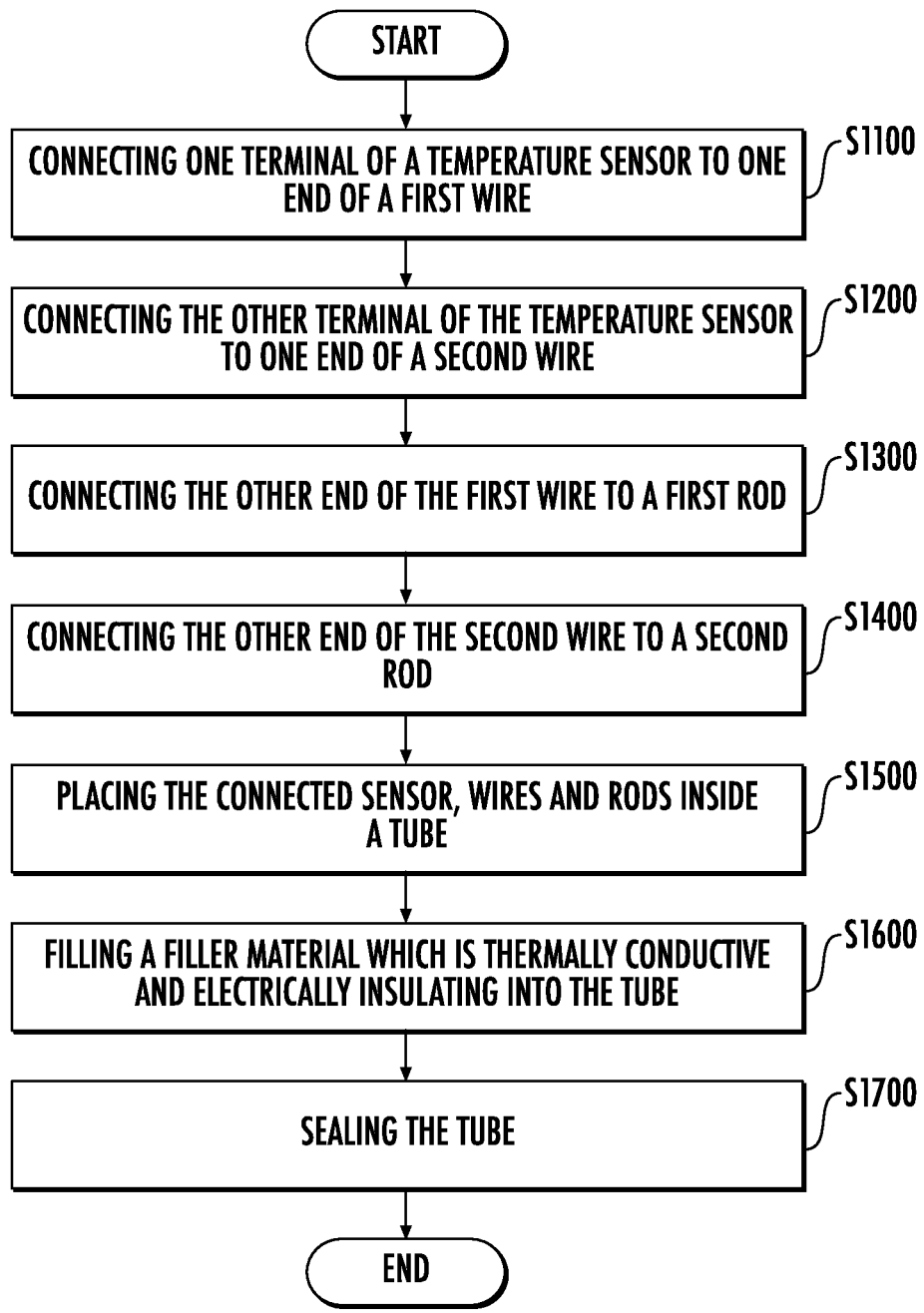
FIG. 8 shows an illustrative flow chart of a manufacturing method of a temperature sensing element for a cooking plate according to an embodiment of the present invention.

FIG. 8 shows an illustrative flow chart of a manufacturing method of a temperature sensing element for a cooking plate according to an embodiment of the present invention. The temperature sensing element is suitable for use in a cooking plate.

As shown in FIG. 8, at step 1100, one terminal of a temperature sensor is connected to one end of a first wire. The first wire could be uninsulated and be cut into length in advance. For example, the temperature sensor is welded to the first wire.

At step 1200, the other terminal of the temperature sensor is connected to one end of a second wire. The second wire could be uninsulated and be cut into length in advance. For example, the temperature sensor is welded to the second wire.

At step 1300, the other end of the first wire is connected to a first rod. For example, the first wire is welded to the first rod.

At step 1400, the other end of the second wire is connected to a second rod. For example, the first wire is welded to the first rod.

At step 1500, the connected sensor, wires and rods is placed inside a tube. The tube has a sheath and can be cut into length in advance.

At step 1600, a filler material which is thermally conductive and electrically insulating is filled into the tube. For example, the filler material includes magnesium oxide powder.

When the filler material is being filled, vibration can be used to compact the filler material and try to minimize voids or air therein.

At step 1700, the tube is sealed. For example, plugs can be added at the ends of the tube.

Furthermore, the tube can be bent to match a cavity in a cooking plate.

In an example, the first and second rods of the temperature sensing element are threaded rods. Caps can be screwed on the first and second rods for power coupling and protection of the rods.

The finished temperature sensing element can be that shown in FIG. 7, for example.

Figure 9:
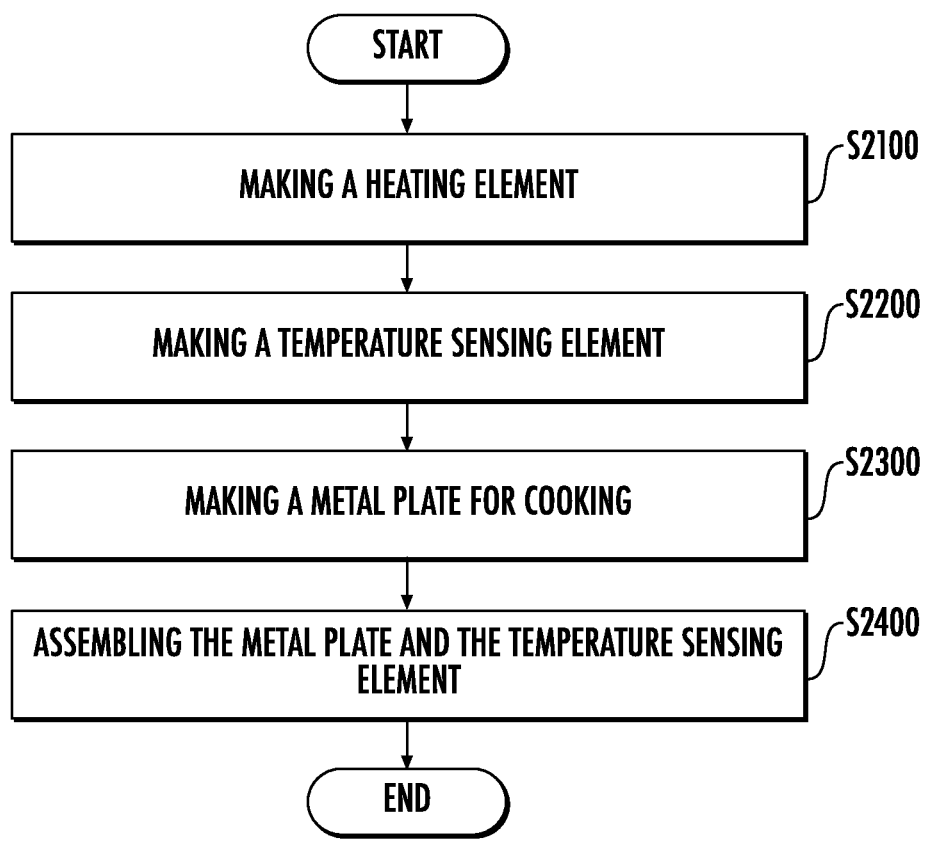
FIG. 9 shows a manufacturing method of a cooking plate according to an embodiment of the present invention.

FIG. 9 shows a manufacturing method of a cooking plate according to an embodiment of the present invention.

At step 2100, a heating element is made.

For example, first, a resistive wire is prepared and is cut to length. One end of the resistive wire is connected to a first rod, for example, by welding. The other end of the resistive wire is connected to a second rod, for example, by welding.

Next, a heating tube is prepared. In the heating tube, a first filler material which is thermally conductive and electrically insulating is filled. The heating tube has a hollow cavity. The heating tube is cut to length in advance.

The resistive wire is threaded through the hollow cavity of the heating tube. The heating tube is rolled through a roller that applies radial pressure to the heating tube and shrinks the diameter of the heating tube. The first filler material should compact and encase the resistive wire at the center of the heating tube.

The heating tube is bent and the first and second rods reach out of the heating tube. For example, the tube is bent into at least five U-shape bends to obtain a better heating performance.

At step 2200, a temperature sensing element is made.

For example, the temperature sensing element is made can be made according to the manufacturing method as shown in FIG. 8.

At step 2300, a metal plate for cooking is made. In an example, the heating element is integrated with the metal plate by casting.

For example, the heating element is placed in a cooking plate die casting mold at a designed position. The ends of the heating element can be captured in mold inserts that protect the ends of the heating element from coming in contact with the die cast metal such as aluminum.

A die casting process is performed with the cooking plate die casting mold to form a metal plate with the integrated heating element.

Processes such as deburring, grinding, polishing, and sand blasting can be performed on the metal plate in preparation for coating. Then, nonstick coating can be applied on the front surface of the metal plate for cooking use.

At step 2400, the metal plate and the temperature sensing element are assembled so that the temperature sensing element is integrated with the metal plate.

The heating element is integrated with the metal plate. End caps can be assembled to ends of the heating element to protect the rods of the heating elements. Also, high temperature silicone glue can be applied around the ends of the heating element, and water resistant plugs can be affixed over the ends of the heating tube. Electrically insulating stand-offs can be placed under the ends of the heating tube. The stand-offs can be affixed with screws where necessary.

Electrical terminal caps can also be placed onto the ends of the heating element. The electrical terminal caps are crimped to be permanently affixed to the heating element threaded rod and prevent loosening. Alternatively, high temperature thread locking glue can be used as long as the electrical conductivity pathway is not inhibited.

The temperature sensing element is placed in a cavity at a back side of the metal plate. Stand-offs can be amounted to support the temperature sensing element. The temperature sensing element is affixed on the metal plate by using a pressure plate.

Then, a cook plate latch pieces are fastened onto the metal plate.

Figure 10:
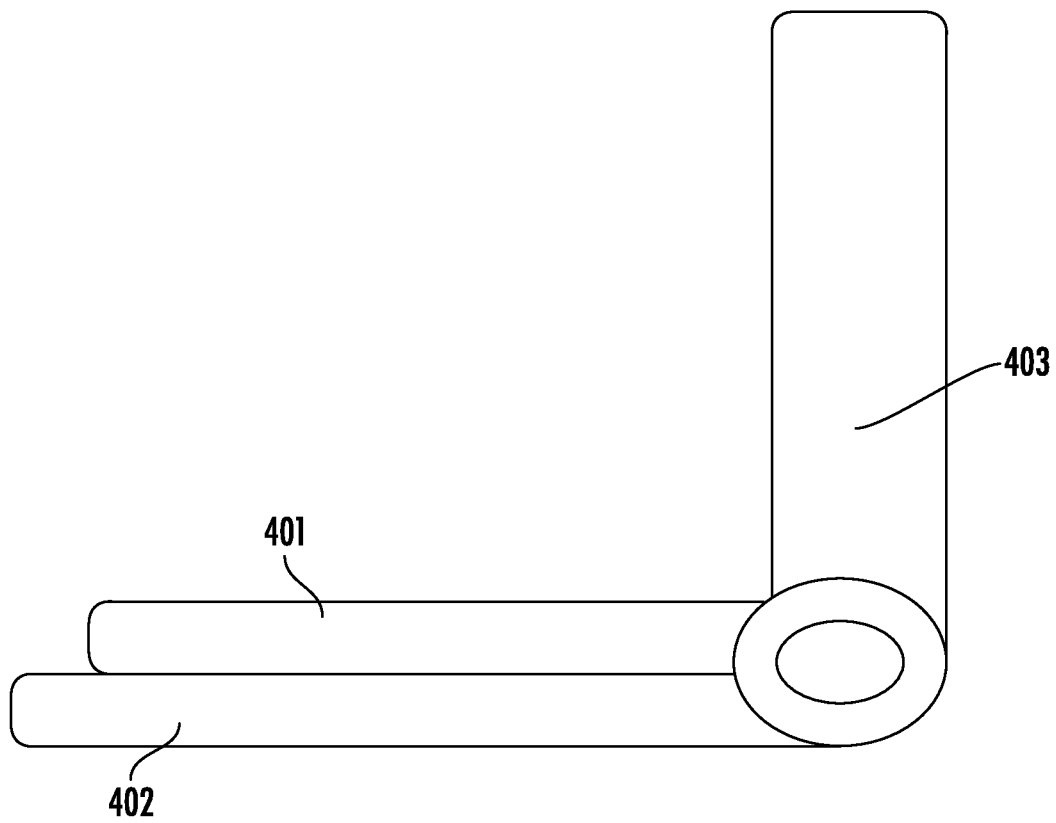
FIG. 10 shows a schematic diagram of a cooking appliance according to an embodiment of the present invention.

FIG. 10 shows a schematic diagram of a cooking appliance according to an embodiment of the present invention.

As shown in FIG. 10, the cooking appliance includes a cooking plate 401, a base 402 and a lid 403. The cooking plate 401 is the one according to the embodiments of this invention and it is placed on the base 402. The lid 403 will cover cooking plate 401 when cooking. It would be understood by a person skilled in the art that FIG. 10 is just illustrative and the present invention is not limited to it. For example, an additional cooking plate according to the embodiments of this invention can be amounted on the lid 403. By this way, the present invention can be used in an electric countertop grill device.

The cooking appliance according to embodiments of the present invention is portable, for example.

The embodiments of the present invention are summarized as below.

EE1. A cooking plate, including: a metal plate for cooking; a heating element, which is in contact with the metal plate and is configured to heat the metal plate; and a temperature sensing element which is integrated with the metal plate and which is configured to sense a temperature of the metal plate and outputs a sensing signal for control heating of the heating element.

EE2. The cooking plate according to EE1, where the heating element includes a resistive wire.

EE3. The cooking plate according to any of EE1 and EE2, where the resistive wire is encapsulated in a first tube, and a first filler material which is thermally conductive and electrically insulating is filled between the resistive wire and the sheath of the first tube.

EE4. The cooking plate according to any of EE1 to EE3, where the first filler material is magnesium oxide.

EE5. The cooking plate according to any of EE1 to EE4, where the resistive wire is connected with a rod at each of its ends and the rods reach out of the first tube for power coupling.

EE6. The cooking plate according to any of EE1 to EE5, where the heating element is bent into at least five U-shape bends.

EE7. The cooking plate according to any of EE1 to EE6, where the heating element is integrated with the metal plate.

EE8. The cooking plate according to any of EE1 to EE7, where the heating element is embedded in the metal plate by mold casting.

EE9. The cooking plate according to any of EE1 to EE8, where a spacing material which has a less thermal conductivity than that of the metal plate is inserted between the temperature sensing element and the heating element.

EE10. The cooking plate according to any of EE1 to EE9, where the spacing material is air.

EE11. The cooking plate according to any of EE1 to EE10, where the temperature sensing element includes a temperature sensor, and the effective distance between the cooking surface of the metal plate and the heating element is equal to that between the temperature sensor and the heating element.

EE12. The cooking plate according to any of EE1 to EE11, where the temperature sensing element is integrated in a cavity at a back side of the metal plate and is affixed on the metal plate by a pressure plate.

EE13. The cooking plate according to any of EE1 to EE12, where the temperature sensing element includes a temperature sensor and a sheath, the temperature sensor is encapsulated in the sheath to form a second tube, and a second filler material which is thermally conductive and electrically insulating is filled between the temperature sensor and the sheath of the second tube.

EE14. The cooking plate according to any of EE1 to EE13, where the temperature sensor is connected with a rod at each of its ends via a wire and the rods reach out of the second tube for power coupling.

EE15. The cooking plate according to any of EE1 to EE14, where the temperature sensing element includes an RTD temperature sensor.

EE16. The cooking plate according to any of EE1 to EE15, where a front surface of the metal plate is used to be in direct contact with food.

EE17. The cooking plate according to any of EE1 to EE16, where a front surface of the metal plate is applied with nonstick coating.

EE18. The cooking plate according to any of EE1 to EE17, where the cooking plate is to be used in a portable cooking appliance.

EE19. A temperature sensing element for a cooking plate, including: a temperature sensor; a sheath; and filler material which is thermally conductive and electrically insulating, where the temperature sensor is connected with a rod at each of its ends via a wire, the sheath encapsulates the temperature sensor, the wires and parts of the rods with the filler material therebetween to from a tube, the rods reach out of the tube for power coupling.

EE20. The temperature sensing element according to EE19, where the temperature sensing element is configured to sense a temperature of the metal plate and outputs a sensing signal for control the heating of the heating element.

EE21. The temperature sensing element according to any of EE19 to EE20, where the temperature sensing element has a shape consistent with a cavity in the cooking plate.

EE22. The temperature sensing element according to any of EE19 to EE21, where the temperature sensor is an RTD temperature sensor.

EE23. A manufacturing method of a temperature sensing element for a cooking plate, including: connecting one terminal of a temperature sensor to one end of a first wire; connecting the other terminal of the temperature sensor to one end of a second wire; connecting the other end of the first wire to a first rod; connecting the other end of the second wire to a second rod; placing the connected sensor, wires and rods inside a tube; filling a filler material which is thermally conductive and electrically insulating into the tube; and sealing the tube.

EE24. The manufacturing method according to EE23, where the first and second rods are threaded rods, and the manufacturing method further includes: screwing caps on the first and second rods.

EE25. The manufacturing method according to any of EE23 to EE24, where the temperature sensor is an RTD-type sensor.

EE26. The manufacturing method according to any of EE23 to EE25, where sealing the tube including: adding plugs at the ends of the tube.

EE27. The manufacturing method according to any of EE23 to EE26, where one and the other terminals of the temperature sensor are connected to one end of the first wire and one end of the second wire, respectively, by welding.

EE28. The manufacturing method according to any of EE23 to EE27, where the other end of the first wire is connected to the first rod by welding, and the other end of the second wire is connected to the second rod by welding.

EE29. The manufacturing method according to any of EE23 to EE28, where filling a filler material including: using vibration to compact the filler material.

EE30. The manufacturing method according to any of EE23 to EE29, where the filler material includes magnesium oxide.

EE31. A cooking appliance, including the cooking plate according to any of EE1 to EE18.

EE32. The cooking appliance according to EE31, where the cooking appliance is a portable appliance.

EE33. A manufacturing method of a cooking plate, including: making a heating element; making a temperature sensing element; making a metal plate for cooking, where the heating element is integrated with the metal plate by casting; assembling the metal plate and the temperature sensing element, where the temperature sensing element is integrated with the metal plate.

EE34. The manufacturing method according to EE33, where making a heating element includes: connecting one end of a resistive wire to a first rod; connecting the other end of the resisitive wire to a second rod; preparing a heating tube, in which a first filler material which is thermally conductive and electrically insulating is filled and which has a hollow cavity; threading the resistive wire through the hollow cavity; rolling the heating tube through a roller to shrink the diameter of the heating tube; and bending the heating tube, where the first and second rods reach out of the heating tube.

EE35. The manufacturing method according to any of EE33 to EE34, where the heating tube is bent into at least five U-shape bends.

EE36. The manufacturing method according to any of EE33 to EE35, where making a temperature sensing element including: connecting one terminal of a temperature sensor to one end of a first wire; connecting the other terminal of a temperature sensor to one end of a second wire; connecting the other end of the first wire to a first sensing rod; connecting the other end of the second wire to a second sensing rod; placing the connected sensor, wires and sensing rods inside a sensing tube; filling a filler material which is thermally conductive and electrically insulating into the sensing tube; and sealing the sensing tube.

EE37. The manufacturing method according to any of EE33 to EE36, where making a metal plate for cooking including: placing the heating element in a cooking plate die casting mold at a designed position; performing a die casting process with the cooking plate die casting mold to form a metal plate with the integrated heating element.

EE38. The manufacturing method according to any of EE33 to EE37, where assembling the metal plate and the temperature sensing element includes: placing the temperature sensing element in a cavity at a back side of the metal plate; and affixing the temperature sensing element on the metal plate by a pressure plate.

Figure 11:
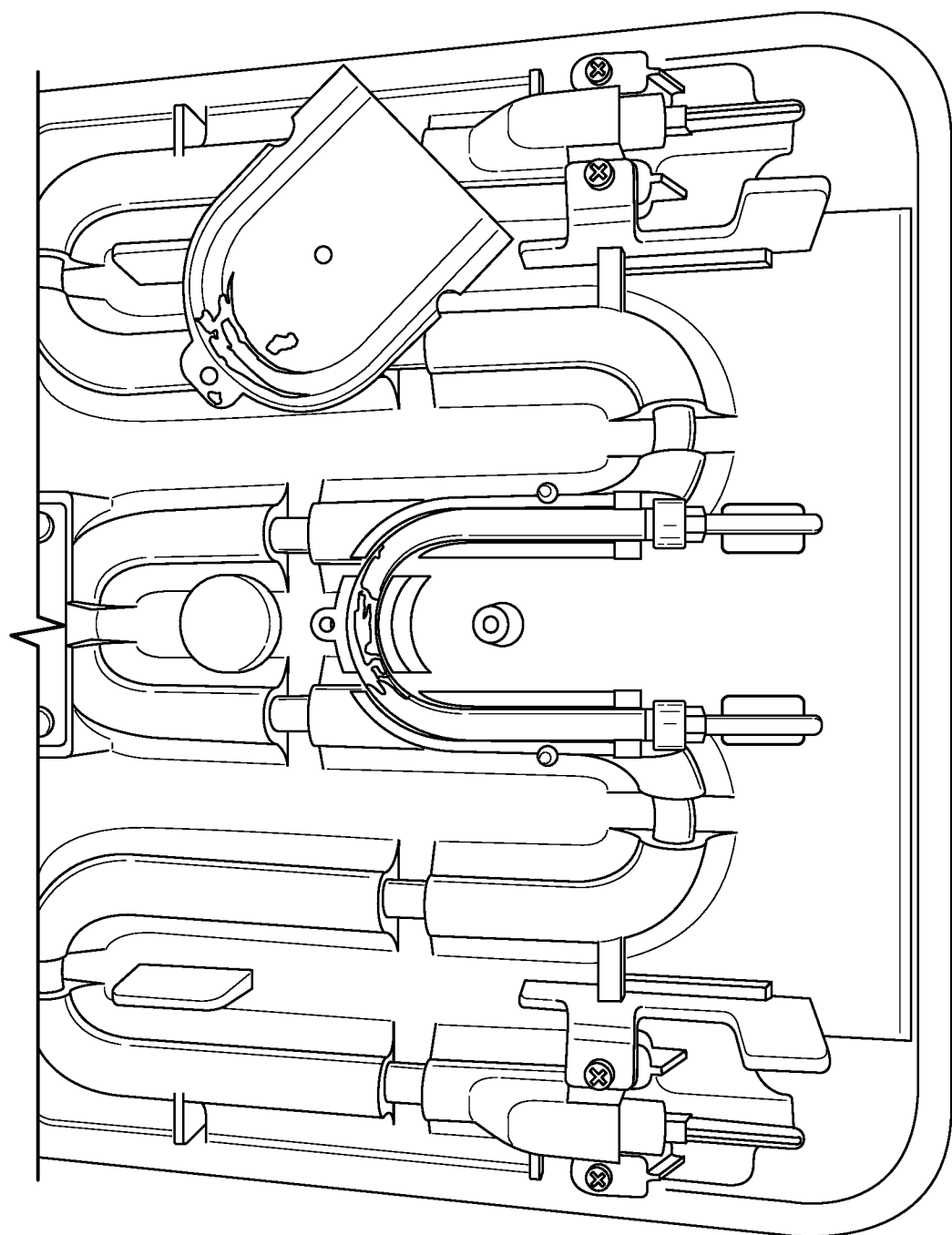
FIGS. 11-12 shows various views of a back side of a cooking plate.
Figure 12:
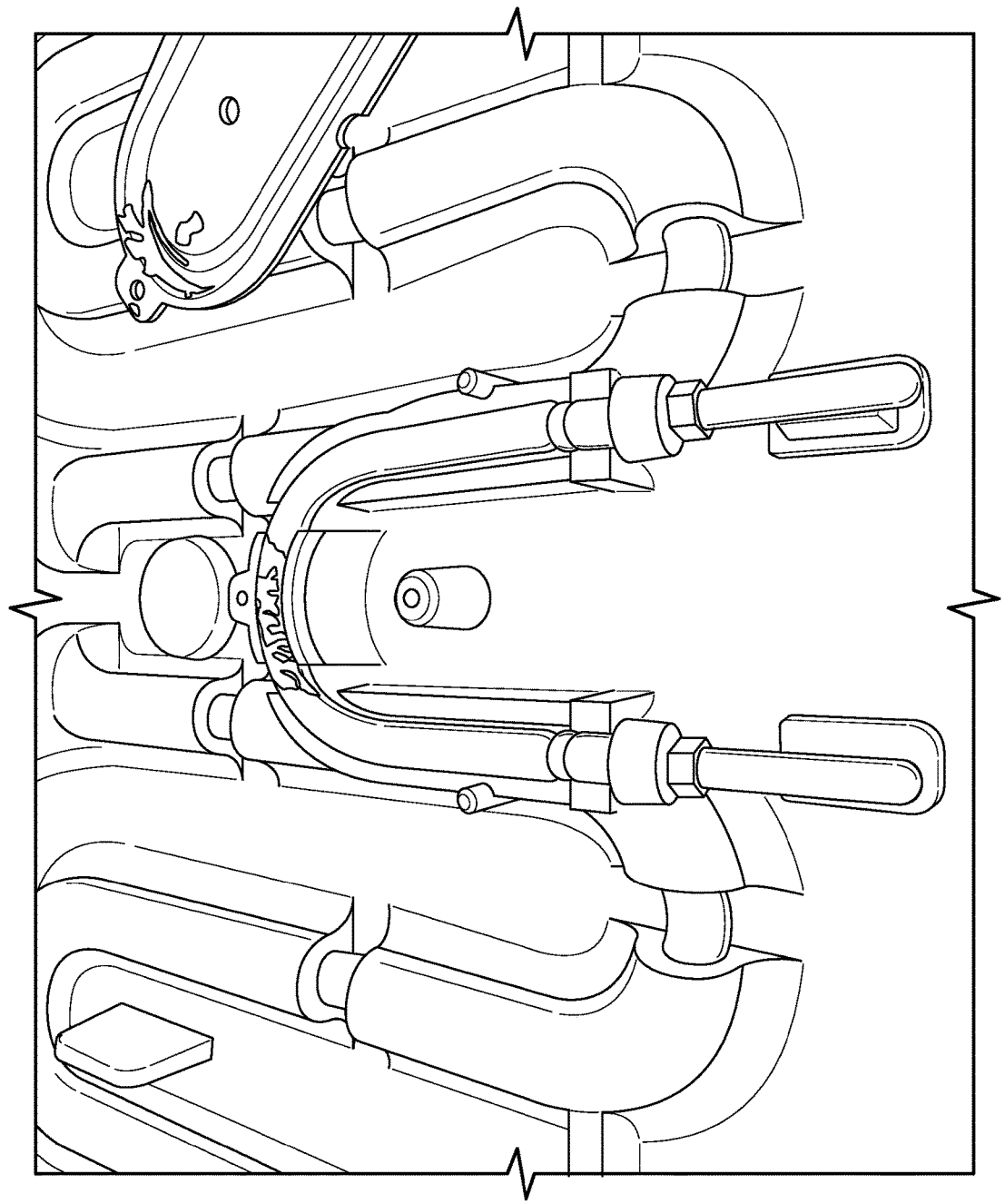
Figure 13:
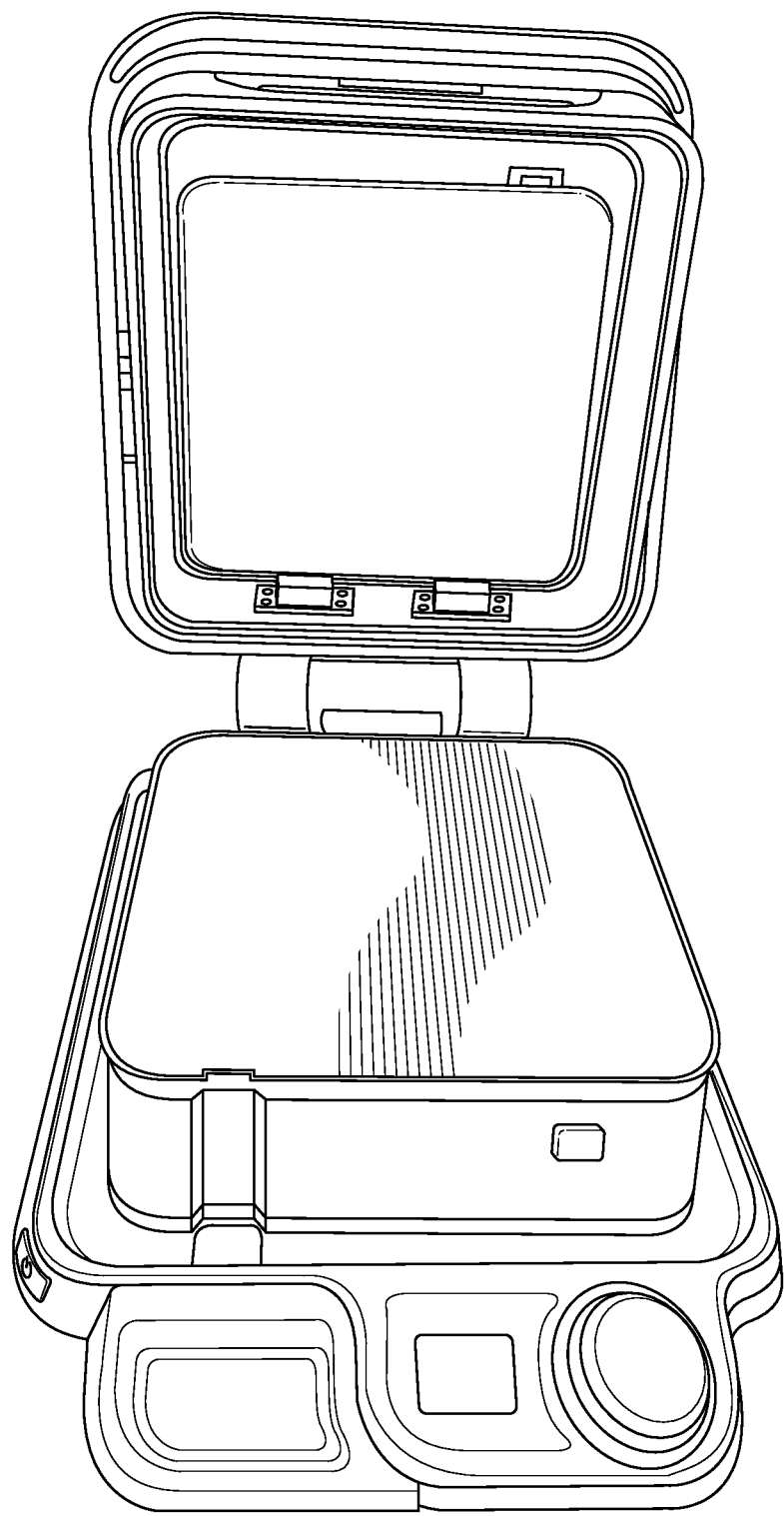
FIG. 13 shows of a cooking device including two cooking plates, an upper cooking plate and a lower cooking plate.

FIGS. 11-12 shows various view of a back side of a cooking plate. FIG. 13 shows of a cooking device including two cooking plates, an upper cooking plate and a lower cooking plate.

The cooking described can be used in a cooking device such as the Cinder Grill product by Palate Home Inc. (Palate Home). With the Cinder Grill, foods cook evenly and to the exact melt-in-your-mouth temperature one would expect from an expensive Michelin-starred meal. This grill uses next-gen thermal control and grill plate materials. Say goodbye to sous vide using plastic bags. The Palate Home Web site (www.cindergrill.com), publications (including white papers, user's guides, tutorials, videos, and others), and other publications about Palate Home technology and products (e.g., Cinder Grill) are incorporated by reference. Some aspects of the Cinder Grill are described in U.S. patent applications 62/553,084, filed Aug. 31, 2017, 62/019,616, filed Jul. 1, 2014, and 61/876,151, filed Sep. 10, 2013, and PCT application PCT/US14/54661, filed Sep. 9, 2014, which are incorporated by reference.

In an implementation, an apparatus includes a first metal plate having a first surface and a second surface. The first metal plate can be an upper or lower cooking plate, or both. The first surface is opposite to the second surface. The first surface includes a cooking surface upon which food to be cooked will be in contact with.

There is a first channel formed in the first metal plate between the first and second surfaces. The first channel has a first opening and a second opening. There is a first portion of a second channel formed in the first metal plate between the first and second surfaces. The first portion of a second channel has a first portion of a third opening and a first portion of a fourth opening.

There is a heating element in the first channel. The heating element has a first end with a first plug extending from the first opening and a second end with a second plug extending from the second opening. The first and second plugs are positioned to be accessed from a first side edge of the first metal plate.

There is a temperature sensing element in the first portion the second channel. The temperature sensing element includes a third end with a third plug extending from the third opening and a fourth end with a fourth plug extending from the fourth opening. The third and fourth plugs are positioned to be accessed from the first side edge of the first metal plate. The third and fourth plugs are positioned between the first and second plugs.

There is a second metal plate connected to the second surface of the metal plate. The metal plate includes a second portion of the second channel, which mates with the first portion of the second channel to form a complete second channel. The metal plate secures the temperature sensing element to the first metal plate. The second metal plate can be fastened using screws to the first metal plate. A first axis of the first channel can be parallel to a second axis of the second channel.

Figure 14:
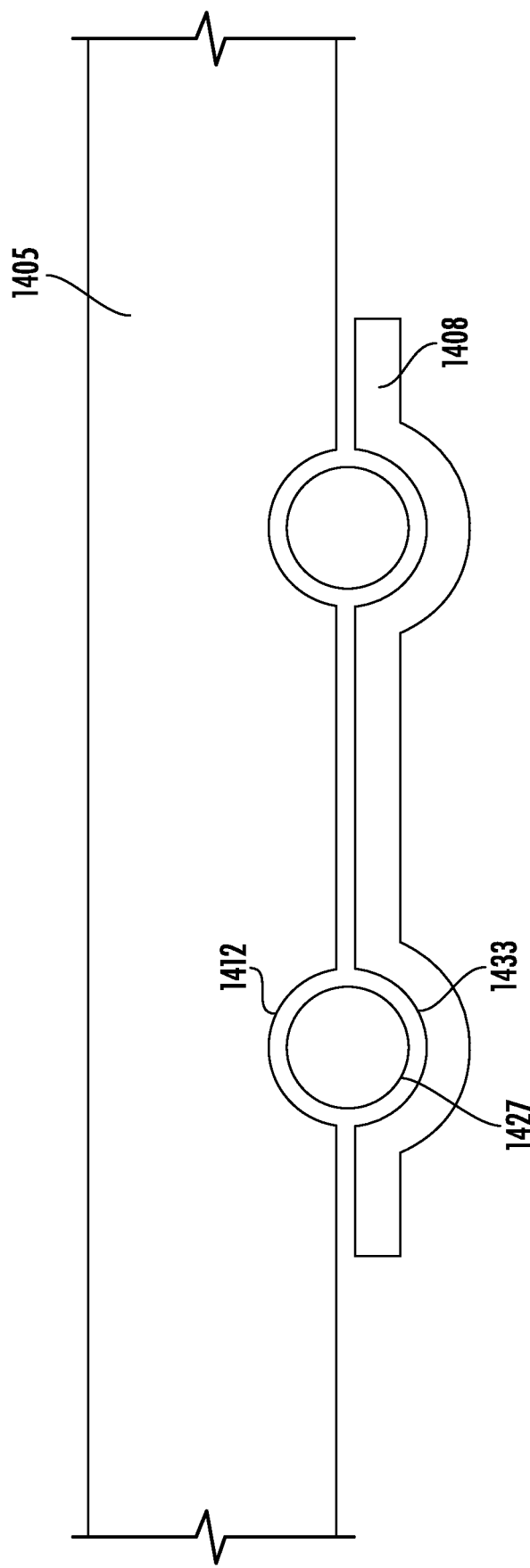
FIG. 14 shows a block diagram of a cross-sectional view of a first metal plate and second metal plate of a cooking device.

FIG. 14 shows a block diagram of a cross-sectional view of a first metal plate 1405 and second metal plate 1408 of a cooking device. The first metal plate has a first portion 1412 of a channel for a temperature sensing element 1427. The second metal plate has a second portion 1433 of the channel. The second metal plate is placed together with the first metal plate so that first portion 1412 and second portion 1433 form a complete channel, which holds the temperature sensing element.

The heating element can include: a first member, connected to the first plug, where the first member extends in a first direction; a second member, connected to the first member, where the second member includes a first bend; a third member, connected to the second member, where the third member extends in a second direction, opposite of the first direction; a fourth member, connected to the third member, where the fourth member includes a second bend; a fifth member, connected to the fourth member, where the fifth member extends in the first direction; a sixth member, connected to the fifth member, where the sixth member includes a third bend; a seventh member, connected to the sixth member, where the seventh member extends in the second direction; an eighth member, connected to the seventh member, where the eighth member includes a fourth bend; a ninth member, connected to the eighth member, where the ninth member extends in the first direction; a tenth member, connected to the ninth member, where the tenth member includes a fifth bend; and an eleventh member, connected to the tenth member, where the eleventh member extends in the second direction, and the eleventh member is also connected to the second plug. The first, second, third, fourth, and fifth bends can be 180 degree turns.

The temperature sensing element can include: a first member, connected to the third plug, where the first member extends in a first direction; a second member, connected to the first member, where the second member includes a first bend; and a third member, connected to the second member, where the third member extends in a second direction, opposite of the first direction, and the third member is also connected to the fourth plug. The second member can include or incorporate a temperature sensor. The temperature sensing element can include a filler material having magnesium oxide. In the second channel, a thermal grease can be used to improve the thermal contact between the temperature sensing element (and its temperature sensor) the second surface of the first metal plate.

Between the first member and second member, a first air gap can be formed in the second surface of the first metal plate that separates the temperature sensing element from the second surface. The first air gap exposes a first portion of the temperature sensing element from being enclosed by the second channel.

Further between the second member and third member, a second air gap can be formed in the second surface of the first metal plate that separates the temperature sensing element from the second surface. The second air gap exposes a second portion of the temperature sensing element from being enclosed by the second channel.

Figure 15:
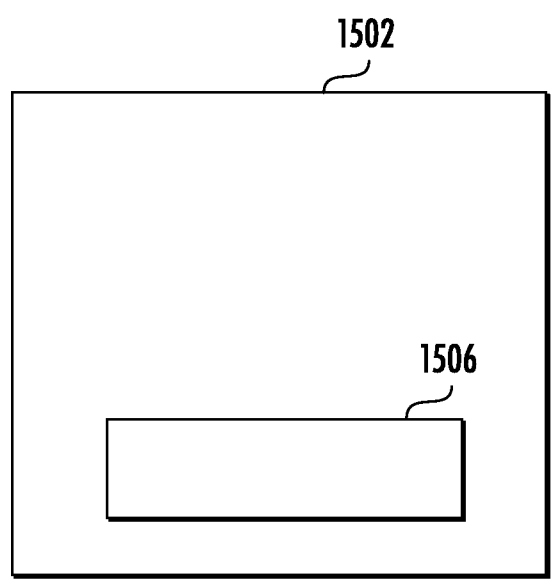
FIG. 15 shows a block diagram of an assembly of a cooking device or cooking appliance and a cooking plate.

FIG. 15 shows a block diagram of an assembly of a cooking device 1502 or cooking appliance and a cooking plate 1506. For example, the cooking plate can include first and second metal plates, a heating element, and a temperature sensing element. In an implementation, the cooking device is a sous vide cooking appliance. In an implementation, the cooking device is an electric grill. In an implementation, the cooking device is an electric grill for sous vide cooking.

Further, the cooking device can include a cooking plate as described that is used as an upper cooking plate and a lower cooking plate. The upper cooking plate will be in contact with the food to be cooked on a first side. The lower cooking plate will be in contact with the food to be cooked on a second side, opposite of the first side. The upper cooking surface will be heated by a first heating element of the upper cooking plate. And the lower cooking surface is heated by a second heating element of the lower cooking plate. The upper cooking surface will be sensed by a first temperature sensing element of the upper cooking plate. And the lower cooking surface will be sensed by a second temperature sensing element of the lower cooking plate.

The cooking plate with the heating element and temperature sensing element of the cooking device are self-contained, so the plate can be removed and cleaned separately from the cooking device. As shown in FIGS. 11 and 12, there is a rubber grommet at each opening (e.g., four total for one plate) where the elements have ends and plugs that exit the opening. This rubber grommet prevents water from getting into the channel, which can damage the heating and temperature sensing elements. The plugs of the elements of the plate are males ends that plug into receptacles of the cooking device, thus supplying electricity to the elements.

In an implementation, the cooking surface of the metal plate is relative flat or planar, not having raised regions (e.g., rails or protrusions) or grooves. This flat surface allows more even temperature distribution to the food being cooked, which is important for sous vide cooking. In sous vide, the typical temperature of the plate will be between 30 degrees Celsius to about 100 degrees Celsius (or boiling temperature of water). A goal is to cook the food evenly to a precise doneness temperature, without overshooting this doneness temperature for any portion of the food (which typical occurs in traditional cooling). The cooking surface also has an edge wall that surrounds a perimeter of cooking surface except for a opening, which allows moisture to escape. Also in an implementation, the cooking surface is not sloped but entirely level (e.g., transverse or about transverse to a direction of gravity), so gravity does not cause a flow direction for liquids in any particular direction.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. An apparatus comprising:
a first metal plate comprising a first surface and a second surface, wherein the first surface is opposite to the second surface, and the first surface comprises a cooking surface upon which food to be cooked will be in contact with;

a first channel, formed in the first metal plate between the first and second surfaces, wherein the first channel comprises a first opening and a second opening;

a first portion of a second channel, formed in the first metal plate between the first and second surfaces, wherein the first portion of the second channel comprises a first portion of a third opening and a first portion of a fourth opening;

a heating element, in the first channel, wherein the heating element comprises a first end comprising a first plug extending from the first opening and a second end comprising a second plug extending from the second opening, and the first and second plugs are positioned to be accessed from a first side edge of the first metal plate;

a temperature sensing element, in the first portion the second channel, wherein temperature sensing element comprises a third end comprising a third plug extending from the third opening and a fourth end comprising a fourth plug extending from the fourth opening, the third and fourth plugs are positioned to be accessed from the first side edge of the first metal plate, and the third and fourth plugs are positioned between the first and second plugs; and a second metal plate, coupled to the second surface of the first metal plate, wherein the second metal plate comprises a second portion of the second channel, which mates with the first portion of the second channel to form a complete second channel, and the metal plate couples the temperature sensing element to the first metal plate.

2. The apparatus of claim 1 wherein a first axis of the first channel is parallel to a second axis of the second channel.

3. The apparatus of claim 1 wherein the heating element comprises:

a first member, coupled to the first plug, wherein the first member extends in a first direction;

a second member, coupled to the first member, wherein the second member comprises a first bend;

a third member, coupled to the second member, wherein the third member extends in a second direction, opposite of the first direction;

a fourth member, coupled to the third member, wherein the fourth member comprises a second bend;

a fifth member, coupled to the fourth member, wherein the fifth member extends in the first direction;

a sixth member, coupled to the fifth member, wherein the sixth member comprises a third bend;

a seventh member, coupled to the sixth member, wherein the seventh member extends in the second direction;

an eighth member, coupled to the seventh member, wherein the eighth member comprises a fourth bend;

a ninth member, coupled to the eighth member, wherein the ninth member extends in the first direction;

a tenth member, coupled to the ninth member, wherein the tenth member comprises a fifth bend; and an eleventh member, coupled to the tenth member, wherein the eleventh member extends in the second direction, and the eleventh member is also coupled to the second plug.

4. The apparatus of claim 3 wherein the first, second, third, fourth, and fifth bends comprise 180 degree turns.

5. The apparatus of claim 1 wherein the temperature sensing element comprises:

a first member, coupled to the third plug, wherein the first member extends in a first direction;

a second member, coupled to the first member, wherein the second member comprises a first bend; and a third member, coupled to the second member, wherein the third member extends in a second direction, opposite of the first direction, and the third member is also coupled to the fourth plug.

6. The apparatus of claim 5 wherein the second member comprises a temperature sensor of the temperature sensing element.

7. The apparatus of claim 5 wherein between the first member and the second member, a first air gap is formed in the second surface of the first metal plate that separates the temperature sensing element from the second surface, and the first air gap exposes a first portion of the temperature sensing element from being enclosed by the second channel.

8. The apparatus of claim 7 wherein between the second member and the third member, a second air gap is formed in the second surface of the first metal plate that separates the temperature sensing element from the second surface, and the second air gap exposes a second portion of the temperature sensing element from being enclosed by the second channel.

9. The apparatus of claim 1 wherein the temperature sensing element comprises a filler material comprising magnesium oxide.

10. A device comprises an apparatus of claim 1 that is used as an upper cooking plate and a lower cooking plate, wherein the upper cooking plate is in contact with the food to be cooked on a first side and the lower cooking plate is in contact with the food to be cooked on a second side, opposite of the first side, and the upper cooking surface is heated by a first heating element of the upper cooking plate, and the lower cooking surface is heated by a second heating element of the lower cooking plate.

11. The apparatus of claim 1 wherein the heating element is bent into at least five U-shape bends.

12. The apparatus of claim 1 wherein a spacing material which has less thermal conductivity than that of the first metal plate is inserted between the temperature sensing element and the heating element.

13. The apparatus of claim 12 wherein the spacing material is air.

14. A cooking appliance comprising the apparatus cooking plate according to claim 1.

15. The cooking appliance of claim 14 wherein the cooking appliance is a portable appliance.

* * * * *